Patented Apr. 13, 1926.

1,580,700

UNITED STATES PATENT OFFICE.

MERVILLE S. THOMPSON, OF PENNS GROVE, NEW JERSEY, ASSIGNOR TO E. I. DU PONT DE NEMOURS & COMPANY, OF WILMINGTON, DELAWARE, A CORPORATION OF DELAWARE.

PROCESS OF PRODUCING N-DIHYDRO-1, 2, 1', 2'-ANTHRAQUINONE-AZINE AND ITS DERIVATIVES.

No Drawing. Application filed June 9, 1922. Serial No. 567,172.

*To all whom it may concern:*

Be it known that I, MERVILLE S. THOMPSON, a citizen of the United States, and a resident of Penns Grove, in the county of Salem and State of New Jersey, have invented a certain new and useful Process of Producing N-Dihydro-1, 2, 1', 2'-Anthraquinone-Azine and Its Derivatives, of which the following is a specification.

This invention relates to the production of N-dihydro-1,2,1',2'-anthraquinone-azine and its derivatives, and comprises subjecting 2-amino-anthraquinone or its derivatives to the action of a fused caustic alkali in the presence of organic hydroxylates (that is, alcoholates and phenolates) of metals, and particularly the organic alkali-metal hydroxylates.

The blue coloring matter, N-dihydro-1,2,1',2'—anthraquinone-azine, is usually prepared by the action of fused caustic potash, or a fused mixture of caustic potash and caustic soda, on 2-amino-anthraquinone, preferably in the presence of an oxidizing agent such as potassium nitrate or potassium chlorate. I have discovered that this reaction is promoted, and an increased yield of the azine obtained, by causing it to take place in the presence of an alcoholate, or of a phenolate, of a metal such as sodium. As examples of alcoholates there may be mentioned sodium ethylate, potassium propylate, and sodium butylate; and as examples of phenolates—sodium phenolate, the ortho-, meta-, and para-cresolates of sodium, and sodium naphtholate. By the term "alcoholate", I mean the metal derivative of an alcohol (that is, an hydroxy-hydrocarbon of the aliphatic series), and not the metal derivative of an hydroxy-aldehyde, an hydroxy-ketone or an hydroxy-lactone.

The invention may be illustrated by the following examples:—

1. A mixture of potassium hydroxide (30-lbs.) and sodium hydroxide (15-lbs.) are fused at 250° C. and cooled to about 210° C. Sodium ethylate (5-lbs.) is added slowly to the melt together with potassium chlorate (1.75-lbs.). Powdered 2-amino-anthraquinone (12-lbs.) is then added with good agitation. The mixture is heated to 220° C. for one-half hour and then poured into water. The blue coloring matter is separated by filtration after it is completely precipitated by blowing an excess of air into the boiling solution.

2. A mixture of potassium hydroxide (32 pounds) and sodium hydroxide (13 pounds) are fused at 250–270° C. and cooled to about 220° C. Potassium chlorate (1.75 pounds) may then be added to the melt together with sodium butylate (5 pounds). Powdered 2-amino-anthraquinone (12 pounds) is then added with good agitation. The mixture is heated to 220° C. for one-half hour and poured into water. The coloring matter may be completely precipitated by blowing air into the solution, and then isolated by a subsequent filtration.

To illustrate the substantial increase in yield resulting from the use of organic metal hydroxylates, the actual increases in yield caused by some of these hydroxylates were as follows:—

|  | Per cent. |
|---|---|
| Sodium methylate | 2 |
| Sodium ethylate | 16 |
| Sodium butylate | 20 |
| Sodium phenolate | 20 |
| Sodium cresolate | 15 |

Another advantage attending the use of the organic hydroxylates is the better quality of the azine-derivative obtained.

The conditions of operation are not, of course, limited to the exact conditions specified in the two above examples. For instance the alkalies can be fused at any reasonably high temperature but they must be molten at a temperature of 220° C. The oxidizing agents above-mentioned (whose presence, though desirable, is not essential) should not be added above 220° C. The amount of oxidizing agent specified is 5% in excess of the theoretical amount required. Any decrease in this amount is detrimental to the operation. An increase of 200 or 300% is neither beneficial nor detrimental. The 2-amino-anthraquinone may be added to the melt at a temperature of not less than 195° C. or more than 250° C. In respect to the proportion of materials not less than 3.75 parts of alkalies should be used per one part of 2-amino-anthraquinone.

With respect to the proportion of organic hydroxylate, I prefer to use from about 10 to 12% thereof based upon the weight of fused caustic alkali employed. A smaller proportion of hydroxylate will increase the yield of azine derivative, but not to so great an extent as when about 12% is used. No special advantage appears to result from the use of amounts of hydroxylate in excess of 12%.

Although I have mentioned only a few of the simple alcoholates and the simple phenolates as examples of suitable organic hydroxylates, my invention includes metal-oxyl derivatives of organic compounds in general in which the metal-oxyl group is attached directly to a carbon atom, and especially of organic compounds that do not have substituents which tend to interfere with the catalytic action of the metal-oxyl group.

I claim:

1. The process of producing N-dihydro-1, 2, 1', 2'-anthraquinone-azine and its derivatives, which comprises causing a fused caustic alkali to act on a 2-amino-anthraquinone compound, in the presence of sodium butylate.

2. The process of producing N-dihydro-1, 2, 1', 2'-anthraquinone-azine and its derivatives, which comprises causing a fused caustic alkali to act on a 2-amino-anthraquinone compound, in the presence of an alkali-metal butylate.

3. The process of producing N-dihydro-1, 2, 1', 2'-anthraquinone-azine and its derivatives, which comprises causing a fused caustic alkali to act on a 2-amino-anthraquinone compound in the presence of a metal alkyl oxide in which the alkyl radical contains a whole number of carbon atoms between two and five.

4. The process of producing N-dihydro-1, 2, 1', 2'-anthraquinone-azine and its derivatives, which comprises causing a fused mixture of sodium and potassium hydroxides to act on a 2-amino-anthraquinone compound in the presence of an alkali-metal alkyl oxide in which the alkyl radical contains a whole number of carbon atoms between two and five.

5. The process of producing N-dihydro-1, 2, 1', 2'-anthraquinone-azine and its derivatives, which comprises causing a fused mixture of sodium and potassium hydroxides to act on a 2-amino-anthraquinone compound, in the presence of an alkali-metal butylate.

6. The process of producing N-dihydro-1, 2, 1', 2'-anthraquinone-azine and its derivatives, which comprises causing a fused mixture of sodium and potassium hydroxides to act on a 2-amino-anthraquinone compound in the presence of a non-gaseous oxidizing agent and a metal hydroxylate of an hydroxy-hydrocarbon containing more than two carbon atoms.

7. The process of producing N-dihydro-1, 2, 1', 2'-anthraquinone-azine and its derivatives, which comprises causing a fused mixture of sodium and potassium hydroxides to act on a 2-amino-anthraquinone compound, in the presence of a non-gaseous oxidizing agent and an alkali-metal alcoholate.

8. The process of producing N-dihydro-1, 2, 1', 2'-anthraquinone-azine which comprises adding an oxidizing agent, a sodium alcoholate, and 2-amino-anthraquinone to a fused mixture of sodium and potassium hydroxides, and maintaining the resulting mixture at a temperature of about 220° C. for about one half-hour.

9. The process of producing N-dihydro-1, 2, 1', 2'-anthraquinone-azine which comprises adding an oxidizing agent, a sodium alcoholate, and 2-amino-anthraquinone to a fused mixture of sodium and potassium hydroxides, the amount of alcoholate added being equal to from about 10 to 12% of the weight of fused caustic alkali present, and maintaining the resulting mixture at a temperature of about 220° C. for about one half-hour.

In testimony whereof I affix my signature.

MERVILLE S. THOMPSON.